Patented May 27, 1947

2,421,113

UNITED STATES PATENT OFFICE 2,421,113

VEGETABLE PROTEIN HYDRATES

Raymond S. Burnett and Earl J. Roberts, New Orleans, La., assignors to the United States of America, as represented by the Secretary of Agriculture No Drawing. Application March 3, 1944, Serial No. 524,966

2 Claims. (Cl. 260—112)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to protein compositions, and has among its objects the provision of fluid comparatively stable and relatively clear vegetable protein hydrates. The term "hydrate" is used rather than the term "dispersion," because the composition appears as homogeneous (one-phase) solutions of water in protein while dispersions are considered to be heterogeneous (two-phase) mixtures of protein in water.

Vegetable proteins are ordinarily isolated from peanut and soybean meal or other oleaginous seed meals, by extracting the protein in nearly neutral aqueous solutions or in aqueous alkali solutions, followed by precipitation of the dissolved protein with acid in the isoelectric range and drying of the protein curd thus separated. The isoelectric protein obtained in this manner is modified or denatured to the extent that its dispersibility in water is not complete unless the dispersion is brought to a pH of 9.0 or higher by means of alkali. Proteins of this type yield only cloudy and incomplete dispersions within the pH range of 7.0 to 9.0, and from pH 7.0 down to the isoelectric range (pH 4.0 to 5.0), they show little or no tendency to disperse.

Alkaline vegetable protein dispersions are unsuited for many industrial purposes because they are unstable with respect to their viscosities, and because they gel almost immediately when tanning agents, such as formaldehyde, are added. Moreover, alkaline dispersions of vegetable proteins stain most surfaces, such as wood and paper, and they are not sufficiently tacky for use in preparing adhesives, such as flexible glues and the rewetting adhesives used in making gummed paper and so forth. In addition, if the protein concentration of alkaline dispersions exceeds 15 to 25 percent, gelling will occur within a short time, especially at the higher pH values.

We have found, however, that peanut and soybean proteins form hydrates in the pH range from 4.5 to 9.0 if the amount of water present does not exceed that which we believe to be, and hereinafter refer to as, "bound water." Bound water is presumably united with the protein molecule to form the hydrate, and in this respect differs from ordinary "unbound water." This phenomenon is described in the literature and is discussed in detail in Gortner, Outlines of Biochemistry (2nd ed., 1938), pp. 278–306. Thus, we have found that even in the isoelectric range of peanut and soybean protein, which is between pH 4.0 and 5.0, and which is the range of minimum dispersibility, these proteins yield fluid, homogeneous hydrates at temperatures from ordinary room temperature up to about 50° C., provided water is not present in excess of that which the proteins can bind. If excess water is present, the protein hydrates are not clear and do not become clear even on warming. Where the protein is present as a second phase due to the presence of water in excess of that which the protein can bind, however, it is possible to add more protein to the mixture and to observe that all of the protein completely disappears as the excess water is bound by the added protein to give a one-phase hydrate system.

We have also found that if the pH of the protein-bound water hydrates is adjusted above the isoelectric range, the proteins bind more water and have a greater fluidity at ordinary room temperatures, so that they may easily be applied to surfaces with a brush or with rollers or by other means.

The amount of water that peanut and soybean proteins can bind and the fluidity of protein-bound water hydrates are dependent to some extent on the method of preparation. In general, however, about 35 to 50 percent of water is bound between pH 4.0 and 6.0, about 50 to 60 percent is bound between 6.0 and 7.0, and up to 70 percent is bound between 7.0 and 9.0. At a pH of 9.0 and above, with most derived vegetable proteins there ceases to be a visible distinction between the hydrate and the dispersion as only one phase can be seen irrespective of the amount of water added. Proteins obtained from meal which has received very slight or no heat treatment in processing, and proteins which have been lightly digested or otherwise mildly treated with alkali during or after their separation from the meal, have a tendency to form hydrates which are more fluid at room temperature than proteins which have been more extensively treated or digested with alkali.

An important feature of our invention is that the protein-bound water hydrates having a pH within the range from 4.5 to 9.0 are tacky, and are therefore suitable for use in the preparation of adhesives, as described in our copending application for patent Serial No. 524,967, filed March 3, 1944, and the application for patent Serial No. 524,968, filed March 3, 1944, of Burnett and Parker.

A further advantage of the protein-bound water hydrates prepared according to our invention is that tanning agents, such as formaldehyde, may be added in amounts sufficient to produce water-resistant films on drying and aging, without causing the system to gel prematurely.

A protein-bound water hydrate of the type described is illustrated by the following example:

| | Per cent |
|---|---|
| Peanut or soybean protein | 47.8 |
| Water | 50.0 |
| Sodium hydroxide (to pH 7.0) | 1.2 |
| Preservative | 1.0 |

The above ingredients are mixed together in the proportions indicated.

The proteins used in the example given above were isolated in the usual manner by extracting them with water adjusted with alkali to a pH of 7.5, and precipitating them by adding sulfurous acid to the extract to adjust the pH to the isoelectric point (pH about 4.5) of the proteins. While we prefer a protein prepared in this manner, and also prefer the formula given in the example, it should be understood that proteins obtained from other than solvent-extracted meals, including hydraulic press and expeller meals, and proteins obtained by other extraction methods, can be satisfactorily used. It will also be apparent that the formula used to illustrate our invention may be varied considerably according to the bound water relations described above so long as the amount of water used is sufficient completely to hydrate the protein but is not in excess of that which the protein molecules will bind, the quantity of water varying from 35 to 70 percent of the hydrate as the pH is varied from 4.5 to 9.0, the greater quantity of water being used with the higher pH.

Having thus described our invention, we claim:

1. A process of producing a protein hydrate comprising forming a mixture of water and an isolated protein selected from the group consisting of peanut protein and soybean protein, the quantity of water being about 50 percent of the hydrate and the hydrate having a pH of about 7.0, the water substantially completely hydrating the protein but not being in excess of that which the protein molecules will bind, said hydrate being relatively clear, comparatively stable against gelling, and tacky.

2. A protein hydrate comprising water and an isolated protein selected from the group consisting of peanut protein and soybean protein, the quantity of water being about 50 percent of the hydrate at a pH of the hydrate of about 7.0, said protein being substantially completely hydrated, the water being not in excess of that which the protein molecules will bind, said hydrate being relatively clear, comparatively stable against gelling, and tacky.

RAYMOND S. BURNETT.
EARL J. ROBERTS.

REFERENCES CITED

The following references are of record in the file of this patent:

UNITED STATES PATENTS

| Number | Name | Date |
|---|---|---|
| 1,321,480 | Satow | Nov. 11, 1919 |
| 1,680,264 | Johnson | Aug. 7, 1928 |
| 2,233,213 | Kniseley et al. | Feb. 25, 1941 |
| 2,238,329 | Julian et al. | Apr. 15, 1941 |
| 2,260,640 | Rawling et al. | Oct. 28, 1941 |
| 2,271,620 | Brier et al. | Feb. 3, 1942 |
| 2,274,983 | Hieronymus | Mar. 3, 1942 |
| 2,274,695 | Heberer et al. | Mar. 3, 1942 |
| 2,278,670 | Rauer | Apr. 7, 1942 |

OTHER REFERENCES

Satow, Researches on Oil and Proteid Extraction from Soy-bean, Tohoku Imperial University, Japan, (1921), pages 56 to 58.